April 1, 1969   G. R. E. LEZAN   3,436,638
ELECTRIC REGULATING MEANS HAVING A LONG MEMORY
Filed Jan. 23, 1964
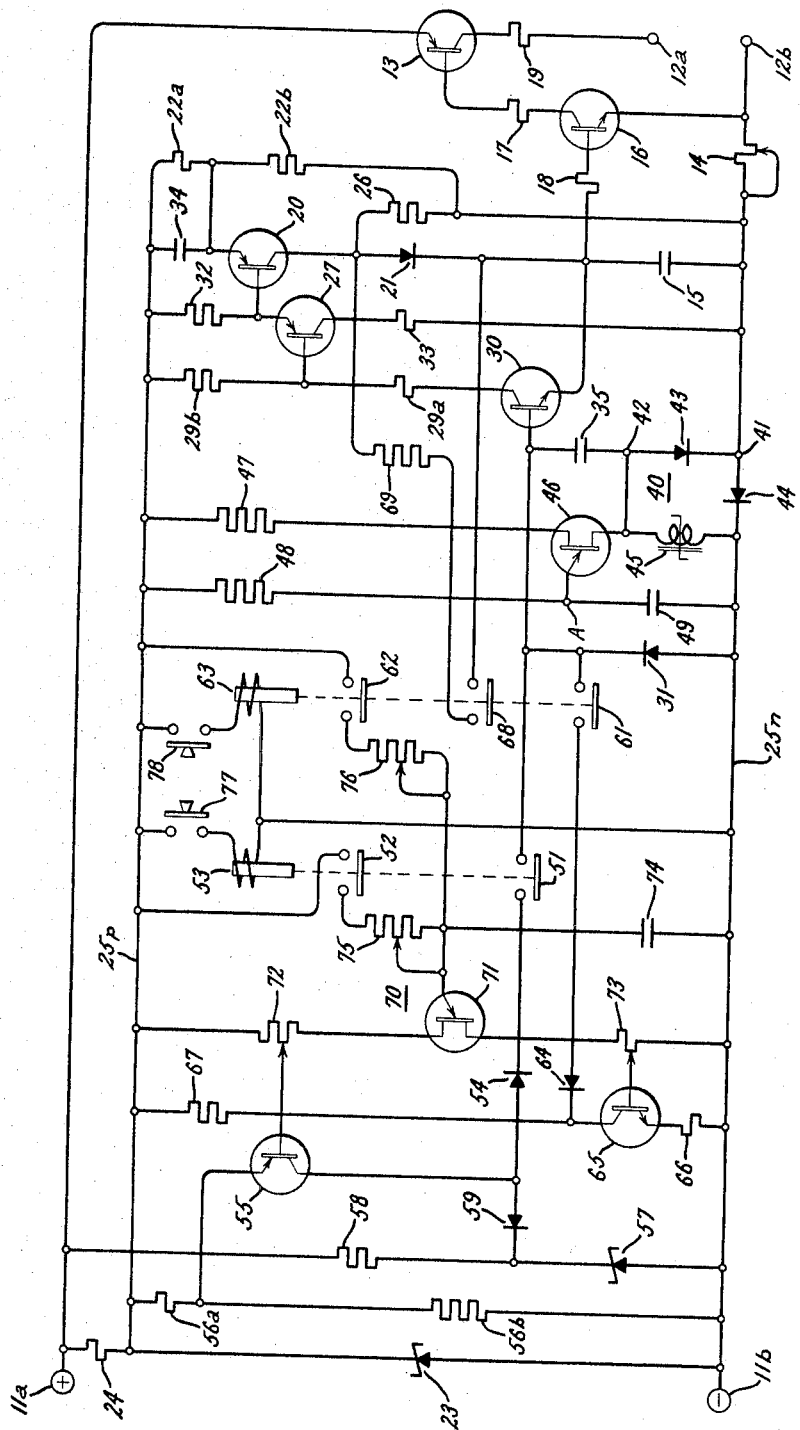
INVENTOR:
GEORGES R. E. LEZAN,
BY Albert S. Richardson Jr.
ATTORNEY

United States Patent Office 3,436,638
Patented Apr. 1, 1969

3,436,638
ELECTRIC REGULATING MEANS HAVING A LONG MEMORY
Georges R. E. Lezan, Cherry Hill, N.J., assignor to General Electric Company, a corporation of New York
Filed Jan. 23, 1964, Ser. No. 339,735
Int. Cl. H02j; H03k 15/18, 17/00
U.S. Cl. 320—1                                19 Claims

ABSTRACT OF THE DISCLOSURE

In controlling the output of an electric power supply as a function of an error signal obtained by comparing an electric quantity that represents the actual output with a reference quantity that represents the desired output, the energy drain on the reference quantity source is minimized by connecting gating means in series therewith to block any error signal except during short time intervals that recur at a predetermined rate.

---

This invention relates to means for regulating D-C electric circuits, and more particularly it relates to means for providing a D-C reference quantity of adjustable magnitude for use in a regulator wherein the amount of energy drained from said means is kept relatively small.

Voltage and current regulators of conventional design will automatically maintain the magnitude of a quantity being regulated at a level corresponding to that of a relatively constant reference quantity, even though the supply or load quantity is subject to magnitude variations. Such regulators are sometimes used in settings requiring changes from time to time in the prescribed level of the regulated quantity, and one objective of the present invention is to provide for this purpose improved means utilizing reliable static components (without moving parts) for obtaining a reference quantity of readily adjustable magnitude.

The source of the reference quantity for regulators may sometimes comprise a standard cell battery; in some applications (such as, for example, the one referred to in the preceding paragraph), an electrostatic source is used. In such cases it is desirable to minimize the amount of electric energy drain on the reference quantity source, and another object of the present invention is the provision of improved regulating means wherein this desired result is obtained.

Yet another object of this invention is the provision of sensitive regulating means using an electrostatic source of reference voltage.

It is another object of the invention to provide improved means for increasing or decreasing the voltage across a capacitor over a wide range of magnitudes at a substantially linear rate.

In carrying out the invention in one form, a controllable means is provided for conducting unidirectional current from a supply of electric energy to a load, and means comprising a charged capacitor is provided for establishing a D-C reference voltage. In order to keep load voltage from falling below a regulated magnitude determined by the reference voltage, the capacitor and a source of voltage representative of the load voltage are interconnected to form a closed loop circuit in which the respective polarities of the reference voltage and of the representative voltage are opposed, and a semiconductor junction is serially connected in this circuit, the junction being poled so that conduction of current in its forward direction reflects discharge of the capacitor. Amplifying means responsive to such conduction is used to control conduction of the aforesaid controllable means in accordance with the magnitude of forward current in the loop circuit, whereby the regulated magnitude of load voltage is maintained. In order economically to provide the above-described regulator with a "memory" of many minutes, it is necessary to minimize the drain on the aforesaid capacitor, and this is accomplished by including gating means in the closed loop circuit for normally blocking forward current therein, the gating means being periodically operative to momentarily provide, in series and in polarity agreement with the reference voltage, a D-C voltage whose magnitude is approximately equal to the magnitude of the voltage drop of the semiconductor junction when conducting forward current. It is only during the recurrent short operating intervals of the gating means that forward current is permitted in the loop circuit. In effect, the load voltage is being periodically sampled, and corrective current is supplied by way of the controllable means to the load only if (and to the extent that) the representative voltage is then less than the reference voltage. This arrangement enables relatively long memory action to be obtained with a smaller (and hence less expensive) capacitor than would otherwise be possible.

In one aspect of the invention, the above-mentioned gating means comprises a diode poled in a sense to block forward current in the closed loop circuit. Normally the diode has a reverse bias voltage applied thereto, and periodically operative means are provided to remove this reverse bias and to supply current to the diode in its forward direction during intervals that recur at a substantially constant predetermined rate.

In another aspect of the invention, there is provided means for varying the charge of the above-mentioned capacitor at a linear rate over a wide range, thereby enabling the reference voltage magnitude to be adjusted as desired. A first normally inactive transistor connected to a source of D-C supply voltage is adapted to be connected to the capacitor for conducting capacitor charging current when active, and a second normally inactive transistor is adapted to be connected in parallel relationship with the capacitor for conducting discharging current when active. Both of the transistors are activated recurrently by oscillatory means. Appropriate switching means connects the capacitor to the first transistor when increased charge is desired and connects the capacitor alternatively to the second transistor when decreased charge is desired. In order to provide for separately adjustable rates of increase and decrease the capacitor charge, the switching means can be arranged to effect operation of the oscillatory means at different frequencies during charging and discharging, and the degree of conduction of each transistor when activated by the oscillatory means can be independently controlled.

The present invention will be better understood and its various objects and advantages will be more fully appreciated from the following description taken in conjunction with the accompanying drawing the single figure of which is a schematic circuit diagram of a preferred embodiment of the invention.

The circuit illustrated in this figure is intended to serve as a source of regulated current of adjustable magnitude. When its input terminals 11a and 11b are energized by D-C supply voltage derived from any suitable source of power, the illustrated circuit will supply unidirectional current to a load (not shown) connected between two load terminals 12a and 12b. By appropriately controlling the conductivity of a PNP transistor 13 that is serially connected between input terminal 11a and load terminal 12a as shown, a nearly constant preselected magnitude of load current is maintained regardless of expectable supply voltage fluctuations and load variations. Either a power dissipating load or a power generating load can be supplied by this current source. It is specifically contemplated that the illustrated embodiment of the invention will be used as a source of relatively constant reference current in a regulator for a battery charger.

In order to regulate the magnitude of the load current (I) conducted by the illustrated transistor 13, a rheostat 14 is connected in series with the load, and the voltage drop (IR) across the effective resistance (R) of this rheostat is compared with the voltage of an oppositely poled reference voltage element 15 in a closed loop circuit that includes the emitter-base circuit of an NPN transistor 16. As is shown in the drawing, this transistor's emitter is connected via the rheostat 14 to the relatively negative input terminal 11b, and its collector circuit is connected through the emitter-base junction of the transistor 13 to the relatively positive input terminal 11a. Thus the degree of conductivity of transistor 13 is controlled by transistor 16. Current limiting resistors 17 and 18 are included in the base circuits of the two transistors 13 and 16, respectively, and a current limiting resistor 19 of relatively small resistance is connected between the collector of transistor 13 and the load terminal 12a. By dissipating power the resistor 19 allows the transistor 13 to operate at cooler temperatures than without this resistor.

The reference voltage element 15 in the above-mentioned loop circuit comprises a charged capacitor whose potential is maintained at a relatively constant but adjustable level by other regulating means that will soon be described. Any tendency for the magnitude of current through the rheostat 14 to change is reflected as a load change to the capacitor 15, and the base current of transistor 16 will immediately adjust itself whereby the conductivity of transistor 13 is affected in a manner compensating for this change. The load current conducted by the transistor 13 is essentially proportional to the potential of capacitor 15, and by changing this potential the magnitude of the regulated current can be adjusted over a wide range determined by the selection and setting of the rheostat 14.

The potential of the capacitor 15 is determined and regulated by the remainder of the circuit shown in the drawing. This capacitor can itself be considered an electric energy utilizing load, and its charge is automatically replenished by the action of a PNP transistor 20 connecting the capacitor to the source of D-C electric power 11a, 11b. The collector of the transistor 20 is connected through an isolating diode 21 to the upper terminal of the capacitor 15, and the emitter of this transistor is connected to a voltage divider 22a, 22b which in turn is connected across a Zener diode 23, the resistor 22a having a much lower resistance value than resistor 22b. The Zener diode 23 is connected in series with a resistor 24 between the input terminals 11a and 11b, and it establishes a substantially constant supply voltage of appropriate magnitude (e.g., 20 volts) for the illustrated circuitry. Connections to the negative terminal of the Zener diode 23 are made by means of a common bus 25n, while connections to the positive terminal of this diode are made by means of a supply voltage bus 25p of positive potential with respect to 25n. A collector resistor 26 is connected between the negative bus 25n and the collector of transistor 20, in parallel with the diode 21 and the capacitor 15 as shown.

The emitter-base junction of transistor 20 is normally reversely biased, and therefore this transistor is normally inactive. When activated, it will conduct unidirectional charging current of controllable magnitude from the supply voltage source to the capacitor 15. This conduction is controlled by means of another PNP transistor 27 and an NPN transistor 30, the latter transistor being responsive to the magnitude of an error signal developed in a closed loop circuit that includes, in series with each other, the emitter-base circuit of transistor 30, the capacitor 15, and an oppositely poled capacitor 35.

The capacitor 15 in the last-mentioned closed loop circuit provides a D-C voltage representative of its charge, while the capacitor 35 provides a D-C voltage dependent on a relatively constant reference voltage that will determine the potential of capacitor 15. The capacitance of capacitor 35 is larger than that of capacitor 15, for example 30 microfarads as compared to 10. These two capacitors are arranged so that the polarities of their respective voltages are in opposition, and an error current will tend to flow in a clockwise diection in the loop circuit when the magnitude of voltage across the capacitor 15 falls below the magnitude of voltage across the capacitor 35. This error current reflects discharge of the capacitor 35. The upper terminal of capacitor 35 is connected to the base electrode of the NPN transistor 30, and the upper terminal of capacitor 15 is connected to the associated emitter, whereby the semiconductor junction formed by these electrodes of transistor 30 is appropriately poled to conduct in its forward direction the aforesaid error current. Such forward conduction by this junction will activate the transistor 30.

The collector of the transistor 30 is connected to the positive supply voltage bus 25p by way of two resistors 29a and 29b in series, and a diode 31, poled in agreement with the collector-base junction of transistor 30, is connected between the negative bus 25n and the base electrode of 30 to provide temperature compensation. The resistor 29b is shunted by the emitter-base junction of the PNP transistor 27 in series with a resistor 32. The collector of transistor 27 is connected to the negative bus 25n through a resistor 33 of relatively low resistance. The base electrode of transistor 20 and the emitter of transistor 27 are interconnected as shown in the dawing, and a bypass capacitor 34 is connected between the emitter of transistor 20 and the positive bus 25p, in parallel relationship with resistor 22a.

The operation of the transistors 20, 27, and 30 will now be briefly explained. Prior to the activation of transistor 30, both of the transistors 27 and 20 are reversely biased and are therefore maintained inactive. When the transistor 30 becomes conductive in response to energization of its emitter-base junction by the aforesaid error current in the loop circuit comprising capacitors 15 and 35, a portion of its collector current follows a path through the emitter-base junction of transistor 27, thereby forward biasing the same, and the latter transistor is rendered conductive simultaneously with the former. A portion of the total emitter current of transistor 27 provides a forward bias signal for the emitter-base junction of the transistor 20, this signal being dependent on but greatly amplified with respect to the error current that initiated it. (More or less amplifying stages could be used if desired.) The transistor 20 is now switched to an unsaturated conductive state, and the amount of charging current that it supplies to the capacitor 15 while active is determined by the magnitude of the error current. In this manner the potential of capacitor 15 can be constantly maintained at a critical magnitude determined by the reference voltage.

In order to minimize the energy drained from the reference-voltage-providing capacitor 35, there is serially included in the same closed loop circuit periodically operative gating means 40 for normally blocking error current, whereby the regulator operation described in the preceding paragraph is normally disabled. This gating means, during recurrent short-time operating intervals thereof, will present substantially no resistance to error current, and regulator operation is then permitted.

The gating means 40 is connected in the closed loop circuit between terminals 41 and 42, terminal 41 being connected directly to the lower terminal of capacitor 15 and terminal 42 being connected directly to the lower terminal of capacitor 35. In its preferred form, the gating means comprises a diode 43 having cathode and anode terminals respectively connected to the terminals 41 and 42, whereby this diode is poled in a sense to block error current conduction in the loop. Bias means 44, preferably comprising another diode conductively connected between the load terminal 12b and the input terminal 11b, provides a continuous D-C blocking voltage (the forward voltage drop of the diode 44) that is normally applied across the terminals 41 and 42 in polarity opposition to the reference voltage across capacitor 35, thereby reverse biasing the diode 43. For this purpose the anode terminal of the diode 44 is connected directly to terminal 41 and hence to the cathode of diode 43, and the cathode terminal of diode 44 is connected through a path 45 of negligible impedance to terminal 42 and hence to the anode of diode 43. As is indicated symbolically in the drawing, the path 45 preferably comprises a saturable core inductive element or reactor formed by a coil of relatively few turns wound on a core of saturable ferromagnetic material that has (ideally) a "square loop" magnetization curve. Under steady-state conditions the element 45 constitutes a low impedance connection from the negative terminal of the blocking voltage source 44 to terminal 42 of the gating means 40, and therefore the potential of terminal 42 is normally negative with respect to terminal 41.

Periodically the gating means is operative to remove the blocking potential from terminal 42 and to supply current to the diode 43 in its forward direction, whereby a D-C voltage (the forward drop of diode 43) is impressed across the terminals 41 and 42 in polarity agreement with the reference voltage across capacitor 35. This enables error current to flow freely in the closed loop circuit, if the magitude of the voltage across capacitor 15 is then less than the reference voltage magnitude. To achieve this purpose in the preferred embodiment of the invention, the gating means 40 includes a normally inactive double-base diode 46 known in the art as a unijunction transistor. Base-one of the unijunction transistor 46 (the lower base electrode as viewed in the drawing) is connected to the terminal 42 and hence to the anode of diode 43, while base-two is connected through a resistor 47 to the positive supply voltage bus 25p. The associated emitter is connected to a junction point A of a resistor 48 and a capacitor 49 that are connected in series between the supply voltage bus 25p and the negative bus 25n, the lower terminal of capacitor 49 being connected by way of the negative bus 25n to the cathode of diode 44. This combination of elements 46–49 forms a relaxation oscillator well known in the art, and the parameters are appropriately selected so that the unijunction transistor 46 is periodically activated at whatever substantially constant predetermined rate of recurrence is desired, such as 500 operations per second.

Throughout the inactive intervals of the unijunction transistor 46, its base-one-emitter circuit constitutes a high impedance path between terminal 42 and point A of the gating means, and there is negligible current in the inductive element 45. At this time the diode 43 is reversely biased by the blocking voltage derived from the diode 44, and the terminal 42 will be negative with respect to terminal 41. At the same time, the capacitor 49 is charging, and when the potential that is consequently developing at point A attains a critical level equal to the characteristic peak point emitter voltage of the unijunction transistor 46, the unijunction transistor fires (i.e., it abruptly switches from a high impedance to a low impedance state). Each time the unijunction transistor 46 is thus activated, the capacitor 49 is quickly discharged through the base-one circuit of the unijunction transistor which then reverts to its normal inactive state.

During such recurrent short-time operating intervals of the gating means, the inductive element 45 is energized by the discharging current of capacitor 49, and for a brief moment required to saturate its core there is induced in this element a voltage pulse whose polarity is opposed to the polarity of the blocking voltage of diode 44 and whose magnitude is equal to the sum of the forward voltage drops across both of the diodes 43 and 44. In effect the impedance of the element 45 is being periodically changed to a relatively high value, whereupon the diode 43 switches from its non-conductive state to a conductive state and the potential at terminal 42 becomes momentarily positive with respect to terminal 41. While current flows from point A through the emitter-base-one junction of 46 and through the diode 43 in its forward direction, the gating means 40 generates across its terminals 41 and 42 a voltage having a polarity reverse to the polarity of the previously existing blocking voltage and having a magnitude approximately equal to the minimum magnitude of forward voltage drop of the emitter-base junction of the transistor 30 when conducting. Abruptly upon saturation of the inductive element 45, its impedance again becomes negligible, whereby all of the remaining discharging current of the capacitor 49 is diverted through this element and the diode 43 immediately returns to its normal reversely biased, non-conductive state.

The operation of the closed loop circuit comprising the capacitors 15 and 35, the transistor 30, and the gating means 40 can now be readily followed. It will be assumed to begin with that the magnitude of voltage across capacitor 15 has fallen slightly below the magnitude of the reference voltage across capacitor 35. So long as the amount of this voltage difference is less than the magnitude of the blocking voltage being normally provided in the loop circuit by the gating means 40, the emitter-base junction of transistor 30 remains reversely biased and no error current can flow in the loop. The gating means, however, during its regularly recurring operating intervals will momentarily reverse the polarity of the voltage that it supplies to the terminals 41 and 42, and there is then available in the loop circuit a net voltage of appropriate magnitude and polarity to forward bias the emitter-base junction of 30 and to affirmatively drive a pulse of error current therethrough. The minimum forward voltage required across this junction for conduction (its threshold voltage) is in effect contributed by the gating means 40, and the error current magnitude will bear essentially a linear relationship to the actual amount by which the capacitor 15 voltage has fallen below the reference voltage of capacitor 35, even though this voltage difference may be very small. This error current causes conduction of the transistor 30 and hence activates the transistors 27 and 20 in the manner hereinbefore explained, and a corresponding (amplified) amount of charging current is conducted from the supply voltage source to the capacitor 15 to thereby raise its voltage to the correct magnitude as determined by the reference voltage.

The above-described regulating means is very sensitive and precise, and its operation demands relatively little energy contribution on the part of the reference voltage source. Long memory action is achieved with a reference capacitor 35 of economical size. In practice this regulator has operated successfully with a droop of less than 4 percent in the magnitude of the regulated load quantity over a period of ten minutes.

When necessary, the potential of the reference-voltage-providing capacitor 35 can be restored to a preset magnitude, or its magnitude can be increased or decreased to different predetermined levels as desired, by the charge changing means that will next be described. As can be seen in the drawing, the upper terminal of the capacitor 35 has been connected to the positive supply voltage bus 25p by means of a circuit comprising, in series, normally open switch contacts 51 of a normally deenergized relay 53, an appropriately poled isolating diode 54, the emitter-collector circuit of a normally inactive PNP transistor 55, and a relatively low-resistance branch 56a of a voltage divider 56a, 56b. This circuit, when conductive, enables charging current to be supplied to the capacitor 35 from the voltage source, the charging current following a path including the saturable core inductive element 45 in series with this capacitor.

In order to limit the maximum level to which the capacitor 35 can be charged, a reference voltage element comprising a Zener diode 57 is connected in series with a resistor 58 between the input terminals 11a and 11b, and the positive terminal of the element 57 is connected through a blocking diode 59 to the charging circuit in between diode 54 and transistor 55 as shown. Thus the diode 59 and the Zener diode 57 shunt the capacitor 35 and prevent its potential from exceeding a maximum magnitude determined by the breakdown voltage of the Zener diode.

For controllably discharging the capacitor 35, a circuit comprising, in series, normally open switch contacts 61 of a normally deenergized relay 63, an appropriately poled isolating diode 64, the emitter-collector circuit of a normally inactive NPN transistor 65, and a resistor 66 is connected in parallel relationship with the series combination of capacitor 35 and element 45. This circuit, when conductive, enables discharging current to flow from the capacitor 35. A collector resistor 67 of relatively high resistance is connected between the collector of the transistor 65 and the positive supply voltage bus 25p.

In order to enable the previously described capacitor 15 to discharge simultaneously with capacitor 35, the relay 63 is provided with additional normally open switch contacts 68 that are connected in series with a resistor 69 and resistor 26 between the upper and the lower terminals of capacitor 15 to form a normally nonconductive circuit in parallel relationship therewith. The resistance value of resistor 69 is preferably selected so that the time constant of the discharge circuit including capacitor 15 (when this circuit is in its conductive state) is slightly shorter than the shortest time constant of the discharge path for the capacitor 35, and consequently there will be a tedency for the potential of capacitor 15 to decay faster than the potential of capacitor 35 whenever the reference voltage level is being adjusted downwardly.

Both of the transistors 55 and 65 are arranged to be activated recurrently by oscillatory means 70, thereby effecting change of the capacitor 35 charge in a series of recurrent small steps. The oscillatory means 70, which itself is normally inactive, preferably comprises a unijunction transistor 71 whose base-two electrode is connected to the positive supply voltage bus 25p by way of an impedance element 72 comprising a potentiometer, and whose base-one is connected to the negative bus 25n through another impedance element 73 comprising a potentiometer of relatively low resistance. The emitter of the unijunction transistor 71 is connected to a series RC circuit extending across the supply voltage buses 25p and 25n, this circuit comprising a capacitor 74 connected between the associated emitter and the negative bus 25n and two rheostats 75 and 76 connected in parallel relationship with each other between the emitter and the positive bus 25p. The rheostat 75 has in series therewith normally open switch contacts 52 of the relay 53, and the rheostat 76 has in series therewith normally open switch contact 62 of the relay 63.

The parameters of the above-described oscillatory means 70 are chosen so that the unijunction transistor 71 will operate in a relaxation oscillator mode when either of the relays 53 or 63 is energized. The unijunction transistor is then cyclically activated to produce in its interbase circuit intermittent signals or current pulses having a given rate of recurrence, the rate being determined by whichever one of the respective rheostats 75 and 76 is in service and its setting. The operating frequency of the oscillator can be adjusted, from 500 to 50 c.p.s., for example, by changing the rheostat settings.

The emitter-base circuit of the transistor 55 and a selectable portion of the potetiometer 72 are interconnected as shown, whereby the emitter-base junction of this normally inactive transistor is energized by forward bias current in response to each signal-producing operation by the oscillatory means 70. The magnitude of the forward bias current, and hence the degree of resulting conduction in the collector circuit of transistor 55, depends on the setting of the slider of potentiometer 72. The amount of current that the transistor 55 conducts each time it is active (while contacts 51 are closed) for charging the capacitor 35 can be adjusted by changing this setting. The emitter-base circuit of the transistor 65 and a selectable portion of potentiometer 73 are also interconnected, whereby the emitter-base junction of the normally inactive transistor 65 is energized by forward bias current in response to each signal-producing operation by the oscillatory means 70. The magnitude of this forward bias current, and hence the degree of resulting conduction in the collector circuit of transistor 65, depends on the setting of the slider of potentiometer 73. By changing this setting the amount of capacitor discharging current that the transistor 65 conducts each time it is active (while contacts 61 are closed) can be separately adjusted.

Relays 53 and 63 are arranged so that either one or the other is energized whenever an adjustment in the magnitude of the reference voltage across capacitor 35 is desired. To obtain increased voltage, the relay 53 is energized and its contacts close to connect the capacitor to the recurrently conductive source 55 of charging current, whereupon the capacitor is charged in substantially uniform increments of desired magnitude and frequency as determined by the settings of the potentiometer 72 and the rheostat 75, respectively. To obtain decreased voltage, the relay 63 is energized and its contacts close to connect the capacitor 35 alternatively to the recurrently conductive discharge path 65, whereby the capacitor is discharged in substantially uniform decrements of desired magnitude and frequency as determined by the settings of the potentiometer 73 and the rheostat 76, respectively. In either case the capacitor voltage is changed at a substantially linear rate from one level to another, the magntude of the change being directly proportional to the length of time that the respective relay is maintained energized. This rate of change can be adjusted over a wide range, and different rates of increase and of decrease can be selected if desired. Thus a very flexible arrangement has been provided for readily adjusting the magnitude of the reference voltage derived from the capacitor 35.

In the illustrated embodiment of the invention, energiaztion of the relay 53 or of the relay 63 is accomplished by operating the appropriate one of two pushbutton switches 77 and 78 that respectively connect the operating windings of these relays to the supply voltage buses 25p and 25n. In actual practice, however, such pushbutton switches may be replaced by means responsive to predetermined load conditions or changes for automatically energizing and deenergizing the respective relays without manual intervention.

Any magnitude adjustment of the reference voltage of capacitor 35 is immediately reflected by a corresponding change in the magnitude of the voltage across capacitor 15. This follow-up action is achieved by means of the previously described regulating operation of the transistor 20 and the closed loop circuit comprising both of the capacitors 15 and 35, the transistor 30, and the gating means 40. Whenever the reference voltage magnitude is being intentionally lowered, the closed contact 68 of relay 63 enables the capacitor 15 to discharge (through resistors 69 and 26) more rapidly than the capacitor 35 is being discharged, but just enough charging current will be contributed by the regulator to maintain the potential of capacitor 15 approximately equal to that of capacitor 35.

Whenever the reference voltage magnitude is being raised, the recurrent pulses of charging current being supplied to the capacitor 35 periodically energize the saturable core inductive element 45, whereby the frequency of application of permissive voltage to the terminals 41 and 42 of the gating means 40 is increased (as compared to the inherent operating frequency of the gating means itself) and the follow-up action of the regulator is aided. If the increasing potential of capacitor 35 should ever exceed that of capacitor 15 by more than the magnitude of the blocking voltage provided by the diode 44, the regulator would then be effective continuously instead of periodically, thereby more quickly raising the potential of capacitor 15 and reducing the potential difference.

While a preferred form of the invention has been shown and described by way of illustration, many modifications will occur to those skilled in the art. Therefore it is contemplated by the claims concluding this specification to cover all such modifications as fall within the true spirit and scope of the invention.

What I claim as new and desire to secure by Letters Patent of the United States is:

1. Means for regulating a predetermined characteristic quantity of an electric energy utilizing load comprising:
   (a) first means for controllably supplying electric energy from a source to the load;
   (b) second means for providing a relatively constant reference quantity;
   (c) third means connected to the second means and to the load and operative periodically, during predetermined relatively short-time intervals that recur at a substantially constant predetermined rate, for developing during each operating interval a predetermined electric signal if the magnitude of said characteristic quantity is then less than a critical magnitude determined by said reference quantity, the magnitude of the developed signal being dependent on the difference between the characteristic quantity magnitude and the critical magnitude; and
   (d) fourth means connected to the first and third means and responsive to energization by said signal for controlling the amount of energy supplied to the load in accordance with the magnitude of the signal.

2. Voltage regulating means in which the amount of electric energy drained from a reference voltage source is kept very small, comprising:
   (a) controllable means for conducting unidirectional current from a source of power to an electric energy utilizing load;
   (b) a source of D-C reference voltage;
   (c) a closed loop circuit including, in series with each other, first means establishing a D-C voltage dependent on the voltage across the load and second means establishing a voltage dependent on the reference voltage, the polarity of the voltage of said first means being opposed to the polarity of the voltage of said second means, whereby an error current tends to flow in a predetermined direction in the loop circuit whenever the magnitude of the former voltage falls below the magnitude of the latter voltage, said error current being representative of the difference voltage;
   (d) said loop circuit further including, in series with the first and second means, gating means for normally blocking said error current, the gating means being periodically operative for recurrent short time intervals during which it presents substantially no resistance to error current in said loop circuit; and
   (e) means connected to both said loop circuit and said controllable means and responsive to the magnitude of error current in the loop circuit for controlling the amount of current conducted from the power source to the load.

3. Voltage regulating means using an electrostatic source of reference voltage comprising:
   (a) means for controllably conducting unidirectional current from a source of electric power to an electric energy utilizing load;
   (b) means comprising an electrostatic source of voltage for providing a D-C reference voltage;
   (c) a closed loop circuit including said reference-voltage-providing means in series with oppositely poled means for providing a D-C voltage dependent on the magnitude of voltage across the load;
   (d) said closed loop circuit further including periodically operative means that normally provides a predetermined D-C blocking voltage in series with, but in polarity opposition to, the reference voltage, said periodically operative means serving, during recurrent operating intervals thereof, as a source of voltage having a polarity reverse to the polarity of said blocking voltage; and
   (e) said closed loop circuit also including means responsive to a net voltage difference, among all of said voltages in the circuit, of predetermined polarity and of predetermined minimum magnitude, the last-mentioned means being connected to said conducting means for controlling the amount of current conducted to the load in accordance with the magnitude of the difference voltage in excess of said predetermined minimum magnitude.

4. Means for replenishing the charge of a capacitor comprising:
   (a) a capacitor;
   (b) normally inactive means adapted to be connected between the capacitor and a source of D-C electric power for conducting, when active, a controllable magnitude of charging current to the capacitor;
   (c) means for providing a D-C reference voltage;
   (d) circuit means, including the capacitor and the reference-voltage-providing means, adapted to develop an error signal when the magitude of voltage across the capacitor falls below a critical magnitude determined by the reference voltage;
   (e) disabling means associated with said circuit means for normally preventing development of said error signal, said disabling means being operative periodically, during short time intervals that recur at a substantially constant predetermined rate, to enable an error signal to be developed; and
   (f) means responsive to the development of said error signal for activating said normally inactive means and for controlling it according to the error signal magnitude.

5. Means for regulating the voltage of a first capacitor in accordance with a D-C reference voltage derived from a second capacitor comprising:
   (a) a first capacitor;
   (b) normally inactive means adapted to connect the first capacitor to a source of electric power for conducting, when active, charging current from said source to the capacitor;
   (c) means comprising a second capacitor for deriving a D-C reference voltage;
   (d) a closed loop circuit including, in series, the first and second capacitors interconnected in polarity opposition and a semiconductor junction poled so that conduction of current in the forward direction of the junction reflects discharge of said second capacitor;
   (e) said loop circuit including additional means for normally blocking conduction of said forward current so long as the magnitude of the voltage across the first capacitor is not more than a predetermined amount less than the magitude of reference voltage, said additional means being periodically operative to permit forward current conduction if the first capacitor voltage is then less than the reference voltage; and
   (f) amplifying means including said semiconductor junction for activating said normally inactive means in response to conduction of forward current by said junction.

6. Sensitive regulating means comprising:
(a) controllable means for conducting unidirectional current from a source of electric power to an electric energy utilizing load;
(b) means for providing a D-C reference voltage;
(c) a transistor having an emitter, collector, and base electrode;
(d) a closed loop circuit including, in series, the emitter-base junction of said transistor, said reference-voltage-providing means, and means for providing a D-C voltage representative of a predetermined characteristic electric quantity of the load, the polarity of the reference voltage being opposed to the polarity of said representative voltage, and said emitter-base junction being poled to conduct error current in its forward direction when the magnitude of the latter voltage is less than the magnitude of the former;
(e) said closed loop circuit further including means normally blocking conduction of said error current, the last-mentioned means being periodically operative to momentarily provide, in series and in polarity agreement with said reference voltage, a D-C voltage having a magnitude approximately equal to the magnitude of the forward voltage drop of said emitter-base junction when the junction is conducting error current, whereby error current conduction is then permitted; and
(f) means including the collector circuit of said transistor for controlling said controllable means in accordance with the magnitude of the error current during the operating intervals of said periodically operative means.

7. Regulating means comprising:
(a) controllable means for conducting current from a source of electric power to a load;
(b) means comprising a capacitor for providing a D-C reference voltage;
(c) a closed loop circuit including, in series, said reference-voltage-providing means, means for providing a D-C voltage dependent on the magitude of voltage across the load, and a semiconductor junction, said reference voltage and said dependent voltage having opposed polarities and said junction being so poled that conduction of current in its forward direction reflects discharge of said capacitor;
(d) said closed loop circuit further including a source of D-C voltage of alternating polarity comprising
  (i) a diode serially connected in said loop circuit and poled in a sense to block said forward current conduction,
  (ii) means connected to the diode for normally applying a reverse bias voltage thereto, and
  (ii) means operative periodically to remove said reverse bias voltage and to supply current to the diode in its forward direction; and
(e) means responsive to forward current conduction by said semiconductor junction for controlling said controllable means.

8. Means for providing a D-C voltage of alternating polarity comprising:
(a) a pair of D-C supply voltage terminals;
(b) first and second output terminals;
(c) a diode having a cathode and an anode respectively connected to the first and second output terminals;
(d) means for connecting the anode of said diode to the relatively positive supply voltage terminal;
(e) bias means connected to said supply voltage terminals for establishing between relatively positive and negative terminals a continuous bias voltage, the positive terminal of said bias means being connected directly to the cathode of said diode; and
(f) periodically operative impedance changing means for connecting the negative terminal of said bias means through a path of negligible impedance to the anode of said diode, whereby said diode is normally reverse biased by said bias voltage and the first output terminal is normally positive with respect to the second output terminal, the impedance changing means operating periodically to change the impedance of said path to a relatively high value, whereby the diode switches to a conductive state and the second output terminal becomes positive with respect to the first output terminal during the recurrent operating intervals of the impedance changing means.

9. Means for providing a D-C voltage of alternating polarity comprising:
(a) first means adapted to be connected to a source of D-C electric power for establishing between two different terminals a continuous bias voltage;
(b) a pair of output terminals a first of which is connected directly to one of the two terminals of said first means, said one terminal of the first means being of predetermined polarity relative to the other;
(c) a diode connected across the output terminals and poled so that when the diode is in a conductive state the second output terminal will be of said predetermined polarity relative to the first;
(d) second means adapted to be connected to said source of power for developing at a predetermined point of the second means a potential of said predetermined polarity relative to said one terminal of said first means; and
(e) third means for connecting the second output terminal through a normally low impedance path to said other terminal of said first means and for connecting the second output terminal through a normally high impedance path to said predetermined point, whereby said diode is normally reverse biased by said bias voltage and the first output terminal is normally of said predetermined polarity with respect to the second output terminal, the third means being operative periodically to change said normally low impedance path to a relatively high impedance path and to change said normally high impedance path to a relatively low impedance path, whereby the diode is in a conductive state and the second output terminal is of said predetermined polarity with respect to the first output terminal during recurrent operating intervals of the third means.

10. Means for providing between first and second terminals a D-C voltage of alternating polarity, comprising in combination:
(a) a first diode adapted to be conductively connected to a source of D-C electric power, the forward voltage drop of said diode constituting a predetermined bias voltage;
(b) a second diode having cathode and anode connected to said first and second terminals, respectively, the cathode of the second diode also being connected directly to the anode of the first diode;
(c) first means adapted to be connected to a source of D-C electric power for developing a potential of positive polarity relative to the anode potential of the first diode; and
(d) second means for connecting the anode of the second diode through a normally low impedance path to the cathode of the first diode and for connecting the anode of the second diode through a normally high impedance path to said first means, whereby the second diode is normally reverse biased by said bias voltage and the first terminal is normally positive with respect to the second terminal, the second means being operative periodically to change said normally low impedance path to a relatively high impedance path and to change said normally high impedance path to a relatively low impedance path for conducting current from said first means to the anode of the second diode, whereby the second diode is in a conductive state and the first terminal is negative with respect to the second terminal during recurrent operating intervals of the second means.

11. The combination of claim 10 in which
(a) the first means comprises a capacitor and a resistor connected in series with each other, with one terminal of the capacitor being connected to the cathode of the first diode and said relatively positive potential being developed at the junction of the capacitor and the resistor; and
(b) the second means comprises
  (i) a saturable core inductive element connected between the anode of the second diode and the cathode of the first diode to constitute said normally low impedance path, and
  (ii) a normally inactive unijunction transistor the base-one-emitter circuit of which is connected between the anode of the second diode and said junction of said capacitor and said resistor to constitute said normally high impedance path, the base-two-emitter circuit of said transistor being connected in parallel relationship with said resistor, whereby said first and second means form a periodically operative relaxation oscillator.

12. In combination:
(a) controllable means for conducting unidirectional current from a source of electric power to a load;
(b) means comprising a capacitor for deriving a D-C reference voltage;
(c) a closed loop circuit including the capacitor in series with oppositely poled means for establishing a D-C voltage dependent on the voltage across the load, whereby an error current tends to flow in a predetermined direction in the loop circuit when the magnitude of the dependent voltage is less than the magnitude of the reference voltage;
(d) a diode having anode and cathode terminals serially connected in said loop circuit and poled in a sense to block said error current, one of said terminals being connected directly to said capacitor;
(e) bias means for establishing between relatively positive and negative terminals a continuous voltage for reverse biasing said diode, one terminal of said bias means being connected directly to the other terminal of the diode;
(f) a saturable core inductive element connected between the other terminal of said bias means and said one terminal of the diode;
(g) periodically operative means for periodically energizing said inductive element and inducing therein, during recurrent short time intervals, a voltage whose polarity is opposed to the polarity of said reverse bias voltage and whose magnitude is no less than the bias voltage magnitude;
(h) means operative when increased reference voltage magnitude is desired for recurrently connecting a source of unidirectional charging current to said capacitor in series with said inductive element, thereby incrementally charging the capacitor and periodically energizing the element, and;
(i) means connected to both said loop circuit and said controllable means and responsive to the magnitude of error current in the loop circuit for controlling the amount of current conducted by the controllable means.

13. Means for regulating the voltage of a first capacitor in accordance with an adjustable D-C reference voltage derived from a second capacitor comprising:
(a) a first capacitor;
(b) controllable means adapted unidirectionally to conduct charging current from a source of electric power to the first capacitor;
(c) means comprising a second capacitor for deriving a D-C reference voltage;
(d) means for adjusting the magnitude of said reference voltage comprising
  (i) first normally open switching means adapted to be connected to a source of D-C supply voltage for charging the capacitor when the first switching means is closed,
  (ii) means including second normally open switching means for discharging the capacitor when the second switching means is closed, and
  (iii) means for closing the first switching means when increased reference voltage magnitude is desired and for closing the second switching means when decreased reference voltage magnitude is desired;
(e) normally non-conductive means connected in parallel circuit relationship with the first capacitor and operative to a conductive state, for enabling the first capacitor to discharge, in response to said second switching means being closed;
(f) circuit means, including the first and second capacitors, adapted to develop an error signal when the magnitude of voltage across the first capacitor is less than a critical magnitude determined by the reference voltage; and
(g) means responsive to said error signal for controlling the charging current conduction by said controllable means.

14. Means for regulating load voltage according to a reference voltage of adjustable magnitude, comprising:
(a) controllable means for conducting unidirectional current from a source of electric power to a load;
(b) means comprising a capacitor for deriving a D-C reference voltage;
(c) means for adjusting the magnitude of said reference voltage comprising:
  (i) means including first normally open switching means and a first normally inactive transistor connected to a source of D-C supply voltage for charging the capacitor when the first switching means is closed and the first transistor is active,
  (ii) means including second normally open switching means and a second normally inactive transistor for discharging the capacitor when the second switching means is closed and the second transistor is active, and
  (iii) oscillatory means for activating both of said transistors recurrently,
  (iv) said first switching means being closed when increased reference voltage magnitude is desired and said second switching means being closed when decreased reference voltage magnitude is desired;
(d) a closed loop circuit including the capacitor in series with oppositely poled means for establishing a D-C voltage dependent on the voltage across the load, whereby an error current tends to flow in a predetermined direction in the loop circuit when the magnitude of the dependent voltage is less than the magnitude of the reference voltage;
(e) said loop circuit further including gating means normally blocking said error current, the gating means being periodically operative to permit the flow of error current; and
(f) means connected to both said loop circuit and said controllable means and responsive to the magnitude of error current in the loop circuit for controlling the amount of current conducted by the controllable means.

15. Means for changing the charge of a capacitor in a series of recurrent small steps, comprising in combination:
(a) first and second normally inactive transistors each having an emitter, collector, and base electrode;
(b) the emitter-collector circuit of the first transistor being adapted to be serially connected between the capacitor and a source of D-C supply voltage for conducting charging current from the source to the capacitor when the first transistor is active;
(c) the emitter-collector circuit of the second transistor being adapted to be connected in parallel relationship with the capacitor for conducting capacitor discharging current when the second transistor is active;
(d) oscillatory means for activating both of said transistors recurrently; and
(e) means for connecting the capacitor to the emitter-collector circuit of the first transistor when increased charge is desired and for connecting the capacitor alternatively to the emitter-collector circuit of the second transistor when decreased charge is desired.

16. The combination of claim 15 in which the connecting means is additionally arranged to effect operation of the oscillatory means at a first predetermined frequency when increased charge is desired and to effect operation of the oscillatory means at a second predetermined frequency when decreased charge is desired.

17. The combination of claim 15 in which means comprising a diode and a reference voltage element serially connected between the emitter-collector circuit of the first transistor and the source of supply voltage is provided for shunting the capacitor and limiting the maximum level to which it can be charged.

18. In combination:
(a) a capacitor,
(b) a pair of D-C supply voltage terminals,
(c) first and second transistors each having an emitter, collector, and base electrode, one of said transistors being a PNP type transistor and the other an NPN type;
(d) means including first switching means for serially connecting the capacitor and the emitter-collector circuit of the first transistor between said terminals, with said emitter-collector circuit being poled to conduct capacitor charging current when the first transistor is active;
(e) means including second switching means for connecting the emitter-collector circuit of the second transistor in parallel relation to the capacitor, with said emitter-collector circuit being poled to conduct capacitor discharging current when the second transistor is active;
(f) a first impedance element, a third transistor, and a second impedance element serially interconnected in the named order between said terminals;
(g) means for effecting periodic activation of the third transistor;
(h) means interconnecting the emitter-base circuit of the first transistor and said first impedance element for activating the first transistor in response to activation of the third transistor; and
(i) means interconnecting the emitter-base circuit of the second transistor and said second impedance element for activating the second transistor in response to activation of the third transistor.

19. In combination:
(a) relatively positive and negative output terminals;
(b) a capacitor having positive and negative terminals, the positive capacitor terminal being connected directly to the positive output terminal;
(c) a source of D-C voltage of alternating polarity connected between the negative capacitor terminal and the negative output terminal comprising
 (i) a diode having an anode connected to the negative capacitor terminal and a cathode connected to the negative output terminal,
 (ii) bias means having positive and negative terminals for establishing therebetween a continuous bias voltage, the positive terminal of the bias means being connected directly to the cathode of said diode,
 (iii) a saturable core inductive element connected between the anode of said diode and the negative terminal of said bias means, and
 (iv) periodically operative means for periodically energizing said inductive element and inducing therein, during recurrent short time intervals, a voltage whose polarity is opposed to the polarity of said bias voltage;
(d) first normally non-conductive means for connecting a source of D-C supply voltage to said capacitor in series with said inductive element, said first means when conductive enabling charging current to be supplied to the capacitor from said source of supply voltage;
(e) second normally non-conductive means connected in parallel circuit relationship with the series combination of said capacitor and said element, said second means when conductive enabling discharging current to flow from the capacitor; and
(f) means for rendering said first means recurrently conductive when increased capacitor charge is desired and, alternatively, for rendering said second means recurrently conductive when decreased capacitor charge is desired.

References Cited
UNITED STATES PATENTS

| | | | |
|---|---|---|---|
| 3,305,767 | 2/1967 | Beihl et al. | 323—22 |
| 3,323,034 | 5/1967 | Dubin et al. | 321—16 |
| 2,885,623 | 5/1959 | Staufenberg | 320—45 |
| 3,014,169 | 12/1961 | MacIntyre | 320—1 |
| 3,099,782 | 7/1963 | Smith | 320—51 |
| 3,105,160 | 9/1963 | Adler | 307—88.5 |
| 3,176,210 | 3/1965 | Bethke | 320—40 |
| 3,274,500 | 9/1966 | Bengston | 328—108 |

TERRELL W. FEARS, *Primary Examiner.*

JOSEPH F. BREIMAYER, *Assistant Examiner.*

U.S. Cl. X.R.

307—238, 255; 315—241; 321—16; 323—9, 22